United States Patent

Becker

[15] 3,651,281

[45] Mar. 21, 1972

[54] LASER RECORDING SYSTEM USING PHOTOMAGNETICALLY MAGNETIZABLE STORAGE MEDIUM

[72] Inventor: Carl H. Becker, 425 Seale, Palo Alto, Calif. 94301

[22] Filed: June 6, 1969

[21] Appl. No.: 830,965

[52] U.S. Cl. ..............................179/100.2CH, 340/174.1 M

[51] Int. Cl. ..........................................................G11b 7/24

[58] Field of Search..........................340/174.1 M; 350/151; 179/100.2 A, 100.2 CR, 100.2 CH

[56] References Cited

UNITED STATES PATENTS

| | | | |
|---|---|---|---|
| 3,174,140 | 3/1965 | Hagopian et al. | 179/100.2 |
| 3,224,333 | 12/1965 | Kolk et al. | 340/174.1 |
| 3,368,209 | 2/1968 | McGlauchlin et al. | 340/174.1 |
| 3,418,483 | 12/1968 | Fan | 350/151 |

OTHER PUBLICATIONS

Kump et al., Laser Readout For Magnetic Film Memory, I.B.M. Technical Disclosure Bulletin, Vol. 8, No. 9, Feb. 1966, p. 1244 magneto-optic Studies of Thin Goig Sections, Chow et al., I.E.E.E. Transactions on Magnetics, Mag. 4, No. 3, Sept. 1968, pp. 416–421.

*Primary Examiner*—Bernard Konick
*Assistant Examiner*—Robert S. Tupper
*Attorney*—Townsend and Townsend

[57] ABSTRACT

An optical coherent light data recording and reading system utilizing an erasable and/or permanent recording medium. The recording medium is formed of a layer of substantially transparent photomagnetically responsive magnetizable material having a anisotropic optical response under magnetization coated on a substrate or carrier. The substrate may have a reflective surface or a thin reflective metal layer may be interposed between the substrate and the layer of magnetizable material. A polarized beam of coherent light generated by a laser in a wavelength suitable for optical pumping of exchange resonance spinwave modes of the magnetizable material is focused by an optical recording head onto the photomagnetically responsive layer of magnetizable material in a diffraction limited spot size. Optical pumping is achieved by either parametric excitation or quantum-mechanical excitation. The laser beam and recording medium are translated relative to each other and the rate of translation and laser intensity are adjusted so that the thermal temperature developed in the layer of magnetizable material is less than the Curie temperature of the material during recording. The recording laser beam is optically modulated to induce localized photomagnetization along the recording medium to thereby provide remanent tracks of variable birefringence in the magnetizable material as a function of a signal to be recorded. Readout is accomplished with a reading laser by means of the Faraday effect. Preferably optical recording takes place in the spectral region of maximum absorption efficiency by the exchange resonance modes of the recording material while optical readout takes place in the spectral region of maximum Faraday rotation. Ramanent data tracks are erased by secondary scanning of the recording laser at an intensity and/or scanning rate sufficient to heat the record material above the Curie temperature.

30 Claims, 3 Drawing Figures

INVENTOR.
CARL H. BECKER
BY
Townsend and Townsend
ATTORNEYS

INVENTOR.
CARL H. BECKER
BY
Townsend and Townsend
ATTORNEYS

LASER RECORDING SYSTEM USING PHOTOMAGNETICALLY MAGNETIZABLE STORAGE MEDIUM

This invention relates to a new and improved coherent light data recording and reading system such as a laser recording system utilizing an erasable and/or permanent recording medium.

Optical recording and reproducing techniques have been developed in which a highly focused coherent laser light beam is used to selectively burn away portions of a film deposited on a carrier or substrate forming a recording tape or strip. Such techniques provide permanent and extremely high density information recordation and instantaneous information retrieval.

It is an object of the present invention to provide a coherent light high density optical recording system having the additional capability of providing either erasable or permanent data storage.

Another object of the invention is to provide in a coherent light data recording system, a recording medium which permits erasable data storage, erasure of data so stored, and permanent data storage by adjusting the recording laser intensity and/or the scanning velocity of the light beam relative to the recording medium.

A further object of the invention is to provide in a laser recording system, a method and system for erasably storing data by optical excitation of material having an anisotropic optical response under magnetization, in the spectral regions of maximum absorption of the exchange resonance spinwave modes for the material, and for optically detecting the induced birefringence in the spectral regions of maximum Faraday rotation for the material.

In order to accomplish these results, the present invention contemplates providing a recording medium formed of a substrate having coated thereon a layer of substantially transparent photomagnetically responsive material having an anisotropic optical response under magnetization such as a ferrimagnetic iron garnet material. According to one aspect of the invention, a reflective layer such as a thin metal layer is interposed between the substrate and the layer of magnetizable material.

The recording medium is incorporated in a laser recording system which provides high-speed optical scanning of the recording medium by a recording laser beam as the recording medium is translated relative to the laser beam at a relatively lower speed. An optical recording head focuses the laser beam in a diffraction limited spot onto the optical recording medium. Moving parts are phase-locked by servo mechanisms to provide recording in desired track configurations during recording and to provide automatic tracking of data tracks during reading.

According to the invention, the recording laser beam is polarized and the intensity of the laser beam and the rate of relative translation between the focused laser beam and the recording medium are adjusted so that the temperature developed in the layer of magnetizable material on the recording medium is less than the Curie temperature of the material during recording.

The recording laser beam is optically modulated by a signal to be recorded in order to induce localized photomagnetization along the layer of magnetizable material and thereby provide remanent tracks of variable birefringence in the material as a function of the signal to be recorded.

The stored data in the form of locally magnetized tracks having an anisotropic response is read out with a reading laser beam either reflectively or transmissively by means of the Faraday effect. The data may be erased by increasing the laser intensity and/or adjusting the rate of translation between the focused laser beam and the recording medium so that the layer of photomagnetically responsive material is heated to a temperature above its Curie point, thereby destroying the localized magnetization rendering the material paramagnetic. The recording medium may be used again and information re-recorded in the manner set forth above.

In laser recording, according to the present invention, by means of parametric excitation, a signal modulated laser beam is generated in the infrared spectral region at generally twice the exchange resonance spinwave mode frequencies of the magnetizable material. The resonant mode of the material is therefore subharmonic of the optical pumping frequency. In laser recording by means of quantum-mechanical excitation, the signal modulated recording laser beam is generated in the visible or ultraviolet ranges in excitation bands of the $Fe^{3+}$ ions utilizing one of the 11 fundamental transitions between 9804 A. units and 3,750 A. units, as well as the two main absorption peaks at 2,570 A. units and 1,960 A. units, respectively. A feature of the present invention is that laser recording by either parametric or quantum-mechanical excitation is accomplished in spectral regions of maximum radiation absorption for the magnetizable material of the recording medium, thereby providing maximum recording efficiency.

According to another aspect of the invention, erasing of the magneto-optical recordings on the recording medium is effected by increasing the power and intensity of the recording laser during secondary scanning so that a thermal temperature is developed in the recording medium above the Curie point of the photomagnetically responsive magnetizable material.

Readout of the remanent tracks of stored data according to one embodiment of the invention is accomplished by means of the Faraday effect using a second laser or reading laser which generates a beam in the spectral region of maximum Faraday rotation for the magnetizable material of the recording medium. A feature of the invention resides in optically reading stored data at wavelengths providing optimum Faraday effect to thereby provide maximum signal output while at the same time avoiding the exchange resonant mode absorption bands of the recording material thereby avoiding deterioration of stored data during readout.

A feature and advantage of the present invention is provided by the inclusion of a reflective layer in the recording medium intermediate the substrate and the layer of magnetizable material. The reflective layer, which is preferably a thin energy-absorbing metallic layer, permits permanent data storage when the laser beam intensity is increased to a level which permits ablation of the thin metal layer in the form of data bits corresponding to the signal to be recorded. Furthermore, during optical readout of stored data, the reflective layer doubles the Faraday effect by passing the reading light beam back through the magnetizable recording material for reflective readout.

In recent years research has been directed to certain ferrimagnetic materials such as the ferrimagnetic iron garnets. The ferrimagnetic iron garnets, such as yttrium iron garnet (YIG) and gadolinium iron garnet (GdIG) have been produced in substantially transparent form with photomagnetic and thermomagnetic characteristics. Thus, at temperatures below the Curie point for the material, the ferrimagnetic material displays a variety of thermomagnetic and magneto-optical effects. At temperatures above the Curie point, the material is substantially paramagnetic, and any magnetic orientation is destroyed. Magnetic and optical properties of YIG and ferrimagnetic iron garnets have been documented by Wood and Remeika, Journal of Applied Physics, 38:3, pp. 1038–1045 (1967); Teale and Temple, Physical Review Letters 19:16, pp. 904–905 (1967); Enz and van der Heide, Solid State Communications, Vol. 6, pp. 347–349 (Pergamon Press, 1969); Harris, Physical Review, 132:6, pp. 2398–2409 (1963); Clogston, Journal of Applied Physics Supplement 31:198S–204S (1960), and other workers.

Chang, Dillon and Gianola, Journal of Applied Physics 36:3 p. 1110 (1965) have proposed an optical memory based upon thermomagnetic effects at the compensation temperature of GdIG, and MacDonald and Beck, 14th Annual Conference on Magnetism and Magnetic Materials (New York, Nov. 18, 1968) have suggested that the Curie point transition properties of the ferrimagnetic iron garnets be applied in an optical memory. According to the latter suggestion, a film of ferrimagnetic material is uniformly magnetized by a magnetic field at temperatures below the Curie point. The magnetization is thereafter locally dissipated according to the pattern of data to be stored by heating the material above the Curie point thereby destroying the atomic orientation previously induced. Such techniques are dependent upon the thermomagnetic effects at the Curie point transition temperature and are referred to as "Curie point writing" techniques.

According to the present invention other properties of the ferrimagnetic garnets such as yttrium iron garnet and gadolinium iron garnet referred to above, are utilized in a laser recording system. Thus, the direct photomagnetic responsive characteristics of the ferrimagnetic garnets at temperatures below the Curie point are utilized for storing data by means of a modulated laser beam. The localized magnetization induced by the modulated laser beam focused on the recording medium produces a variable anisotropic response or variable birefringence detectable optically by means of the Faraday effect. From the physical point of view, states the system depends upon the parametric excitation and/or localized creation of population inversion (laser action) by means of optical pumping by the laser beam. The coherent light source is selected to provide a wavelength suitable for excitation of exchange resonance spinwave modes in the information storage material in order to induce spin transitions between the pairs of Zeeman sublevels of the Weiss molecular exchange fields in the recording material. The quantum-mechanical excitation and/or parametric excitation of the resonance Zeeman levels in the ferrimagnetic recording material yields negative spin temperatures in the system as a function of the signal to be recorded. The excited states thereafter undergo spin relaxation to minimum energy states having a magnetization or spin orientation providing optical anisotropy which varies along the laser track according to the signal to be recorded. The variable anisotropy of birefringence is thereafter detectable for readout of the stored data by means of the Faraday effect.

Other objects, features and advantages of the present invention will become apparent in the following specification and accompanying drawings.

Figures 1, 2:
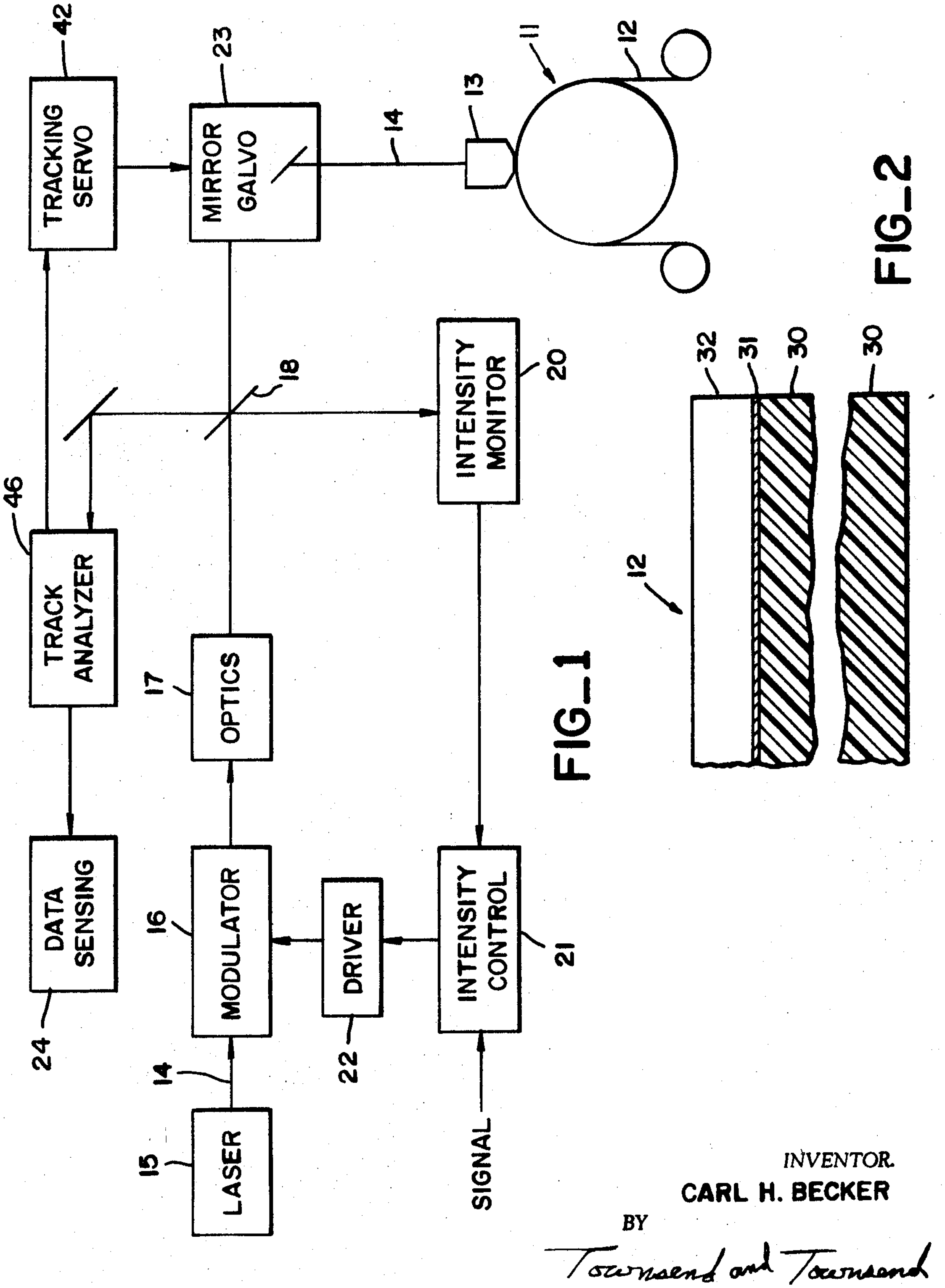
FIG. 1 is a block diagram of a coherent light data recording system according to the present invention.
FIG. 2 is a fragmentary side cross-sectional view of the photomagnetic recording medium for either erasable or permanent recording.

In the embodiments of the present invention described herein the coherent light data recording medium is preferably formed in the configuration of an elongate tape or strip. A tape transport mechanism is provided of the type, for example, described in U.S. Pat. Nos. 3,314,074 and 3,314,075, and U.S. Pat. application Ser. No. 682,478, now U.S. Pat. No. 3,474,457, entitled "Laser Recording Apparatus", of which I am the inventor, or a record medium strip transport mechanism is provided such as, for example, is described in U.S. Pat. application Ser. No. 807,553 entitled "Laser Recording Unit" of which I am a co-inventor. In FIG. 1 a tape transport mechanism 11 is shown schematically within a laser recording system in which the recording medium consists of an elongate tape 12 which is translated relative to the optical record/read head 13 which focuses the beam 14 of coherent light onto the tape 12 in a diffraction limited spot size. The coherent light source consists of laser 15 which provides a polarized light output 14 which is optically modulated by the modulator 16 which may be, for example, Pockel cell light The beam thereafter passes through additional optics 17 which may include, for example, a glan analyzer prism and track-widening optics. Beamsplitter 18 deflects a portion of the light beam to an intensity monitor 20 and intensity control 21 for regulating the intensity level of the modulator by modulator driver 22 for purposes hereinafter described. The modulator 16 is of course also driven by the modulating signal at the input to the intensity control 21 which in turn controls the modulator driver 22. The portion of the polarized modulated light beam 14 which passes through beamsplitter 18 is deflected by a mirror galvanometer 23 through the optical record/read head 13. The mirror galvanometer 23 permits high speed scanning of the laser beam relative to the recording medium 12 through the optical record/read head 13. During recording, the mirror galvanometer is controlled by a signal which provides a record track raster of predetermined configuration on the recording medium. During readout, the mirror galvanometer may be controlled by a feedback signal from the track position analyzer 46 as hereinafter described in order to provide accurate tracking of prerecorded data tracks.

The coherent light data recording medium 12 is shown in cross section in FIG. 2 and consists of a substrate 30 having a reflective layer 31 such as a thin metal layer coated thereon. Coated over the reflective layer 31 is a thin substantially transparent layer 32 of a photomagnetically responsive material having an anisotropic optical response under magnetization. The substrate 30 may be formed of a material such as, for example, Mylar, with a thickness of, for example, 1 to 1½ mils. The reflective layer 31 is formed on the substrate by, for example, vapor deposition or sputtering and can be a metal layer of a material such as aluminum or rhodium having a thickness in the range of 150 A.–1,000 A. and preferably approximately one optical thickness of the particular metal used. One optical thickness is defined as a thickness of the material which affords a transmissivity of 10 percent at the frequency of the incident light. Substantially thicker layers of metal may also be used but the thinner layer provides the alternative of permanent data recording as hereinafter described. Thus, for example, a 200 A. unit coating of rhodium has been found satisfactory.

Coated over the thin metal layer 31 is the layer of erasable data storage material consisting of a thin substantially transparent magnetizable film formed of, for example, a ferrimagnetic garnet material such as YIG or GdIG of a thickness of approximately between 100 A. units and 10 microns. The layer of magnetizable material is formed to obtain maximum thin-film coercivity for the excited magnetic states along the recording while still maintaining enough optical thickness so that a satisfactory amount of magneto-optical (Faraday) rotation is obtained for the reproducing coherent light beam. Minimization in the thickness of the domains is provided by thin-film techniques, small multiples of the domain size approaching the thickness of the ferrimagnetic thin film. The amount ($\theta$) of Faraday rotation in the magneto-optical recording media is determined by the well-known law:

$$\theta = C \cdot H \cdot l$$

where (C) is the Faraday constant; (H) is the magnetic field intensity; and ($l$) is the path length of the light. With a thickness of 111 A., for example, the ferrimagnetic yttrium iron garnet layer comprises approximately 9 unit cubic cells, each of which contains 160 atoms and 8 $Y_3Fe_5O_{12}$ molecules. As a consequence of these dimensions, small multiples of the size of the magnetic domains of the recording medium become of the order of its thickness dimension, concentrating the volume of multiple elementary domains within the imaging region of the incident recording coherent light beam.

During recording, the tape 12 is transported at a relatively low speed relative to the optical record/read head 13 while the mirror galvanometer scans the laser beam at a relatively high speed in a predetermined track configuration. The optical head 13 focuses the laser beam onto the recording medium in a diffraction limited spot size. The recording laser beam impinges on the photomagnetically responsive layer 32 and the laser intensity and tape transport rate are controlled so that the surrounding thermal lattice temperatures developed in the recording layer 32 are at any instant below the Curie temperature of the material but at a level sufficient to induce spinwave excitation and negative spin temperatures in localized tracks. To this end, the laser wavelength is selected to excite the exchange resonance spinwave modes of the recording material 32. Upon relaxation of the excited states to minimum energy configurations there results remanent tracks of variable spin orientation and therefore magnetization as a function of the signal to be recorded. Because of the variable birefringence along the data tracks, the stored data can be optically detected by means of the Faraday effect. Thus, during recording the focused laser beam induces in the recording layer, optical uniaxial anisotropy thereby providing optically detectable remanent tracks of spatial variation in the birefringence of the medium corresponding to signal modulation.

The recorded data can be erased by adjusting the recording laser intensity and the rate of relative translation between the recording medium and laser beam so that the temperature of the material in the layer 32 is increased to a level above the Curie point of the material being used. Above this transition temperature, the photomagnetically responsive material becomes paramagnetic and the tracks of variable atomic orientation and magnetization are destroyed. The medium is thereafter ready for re-recording of new data.

Readout is accomplished optically with the recording laser, or, preferably, with a different frequency laser in order to maximize the Faraday effect. When the same laser is used for recording and reading the reflective layer provides instantaneous reflective readout during recording. Reflective layer 31 provides reflective readout from the data tracks at the data sensing group 24. The subsequent readout of prerecorded data, at non-absorbing frequencies for optically detecting the tracks of variable birefringence formed on the recording medium also avoids destruction or deterioration of the stored data.

There are two principle frequency areas in which to excite exchange-response spinwave modes in YIG by means of optical pumping, characterized by sharp peaks in the absorption spectrum located adjacent to the lower and upper end of the completely transparent region of YIG between 5 and 1.5$\mu$. The lower frequency area may be characterized as a region for parametric optical excitation of exchange-resonance spinwave modes in the 200 cm.$^{-1}$ to 700 cm.$^{-1}$ wave number frequency range. At 200 cm.$^{-1}$ the spin exchange field is in the order of 4 $\times 10^6$ Oersted. The upper frequency area, however, may be defined as a region for quantum-mechanical excitation of the $Fe^{3+}$ ions in YIG by means of optical pumping, utilizing one of the 11 fundamental transitions between 9,804 A. and 3,750 A. as well as the two man absorption peaks at 2,570 A. and 1,960 A., respectively.

An important requirement of this invention is to select the appropriate laser wavelength for optical pumping within the respective infrared, visible and ultraviolet frequency ranges in order to obtain the necessary optical gain in effective recording radiation power density. By selection of a wavelength in the spinwave bands of the recording medium, the optical pumping radiation produces localized negative spin temperatures of the excited states within the imaging area of the laser beam almost entirely to the exclusion of thermal heating of the surrounding lattice.

By way of example, a thin rhodium layer of uniform thickness of approximately 1,000 A. units was coated by sputtering upon a Mylar base having a thickness of 1.42 mils. Coated over the reflective rhodium layer was a layer of yttrium iron garnet formed to a thickness of approximately 1 micron by sputtering. In forming the layers of the recording medium, radio frequency (RF) sputtering has been found to produce successful results. Optical spinwave excitation of the recording medium was accomplished utilizing polarized coherent light beam generated by either a $CO_2$ laser at 10.6 micron, an Argon II ionic laser at 4,880 A. units, or an ultraviolet YAG laser with frequency doubler. A scanning velocity of the laser beam relative to the recording medium of 20 meters per second was utilized, the scanning velocity $V_{scan}$ being related to the recordable frequency band width $f_w$ of the recording, and the smallest possible wavelength $\lambda_w$ equal to the diffraction limits of the system, by the following equation:

$$V_{scan} = 2\,(\lambda_w/2)\,fw$$

In order to provide permanent instead of alterable recording, the laser intensity and scanning velocity are adjusted to a level to permit burning or ablation of the energy-absorbing metal layer 31 in diffraction limited bit sizes. The laser recording medium thus provides permanent data storage. The thermodynamics and desirable parameters of the metal or other energy-absorbing layer 31 are described in my U.S. Pat. application Ser. No. 682,478, now U.S. Pat. No. 3,474,457, entitled "Laser Recording Method and Apparatus", filed on Nov. 13, 1967, and assigned to the assignee of the present case. For example, a 200 A. unit thickness layer of rhodium, approximately one optical thickness of that metal, has been found satisfactory. When the reflective layer 31 is not to be used for permanent recording, greater thicknesses can be used and thicknesses in the range of 200 A. units to a 1,000 A. units have been found satisfactory.

During readout of stored data tracks the laser beam intensity can be adjusted to a low level to prevent destruction of stored data. Preferably, however, a reading laser at a different frequency is utilized in order to optimize the Faraday rotation of the reading light beam by the remanent tracks of stored data. The light beam reflected from the record medium 12 back to the optical read/head 13 is deflected by beamsplitter 18 to the track position analyzer 40 which in turn relays the readout signal to the data sensing group 24 for readout of stored data. The track position analyzer 46 can be of the type described in U.S. Pat. application Ser. No. 807,553, filed Mar. 17, 1969, of which I am co-inventor, and entitled "Laser Recording Unit". Such a track position analyzer includes a division of wave front beamsplitter which provides two outputs, the difference between which two outputs provides an error signal for feedback to the track position servo group 42 which controls the mirror galvanometer to center the incident laser beam directly over a data track recorded on the record medium 12. The two outputs provided from the division of wave front beamsplitter in the track position analyzer 46 are summed to provide an output signal for analysis by the data sensing group 24. For further details of the track position analyzer and servo, reference is made to the U.S. Pat. application Ser. No. 807,553, referred to above. For purposes of the present invention, the track analyzer 46 is modified to include a polarization analyzer for developing the Faraday effect in the sensed light beam.

Figure 3:
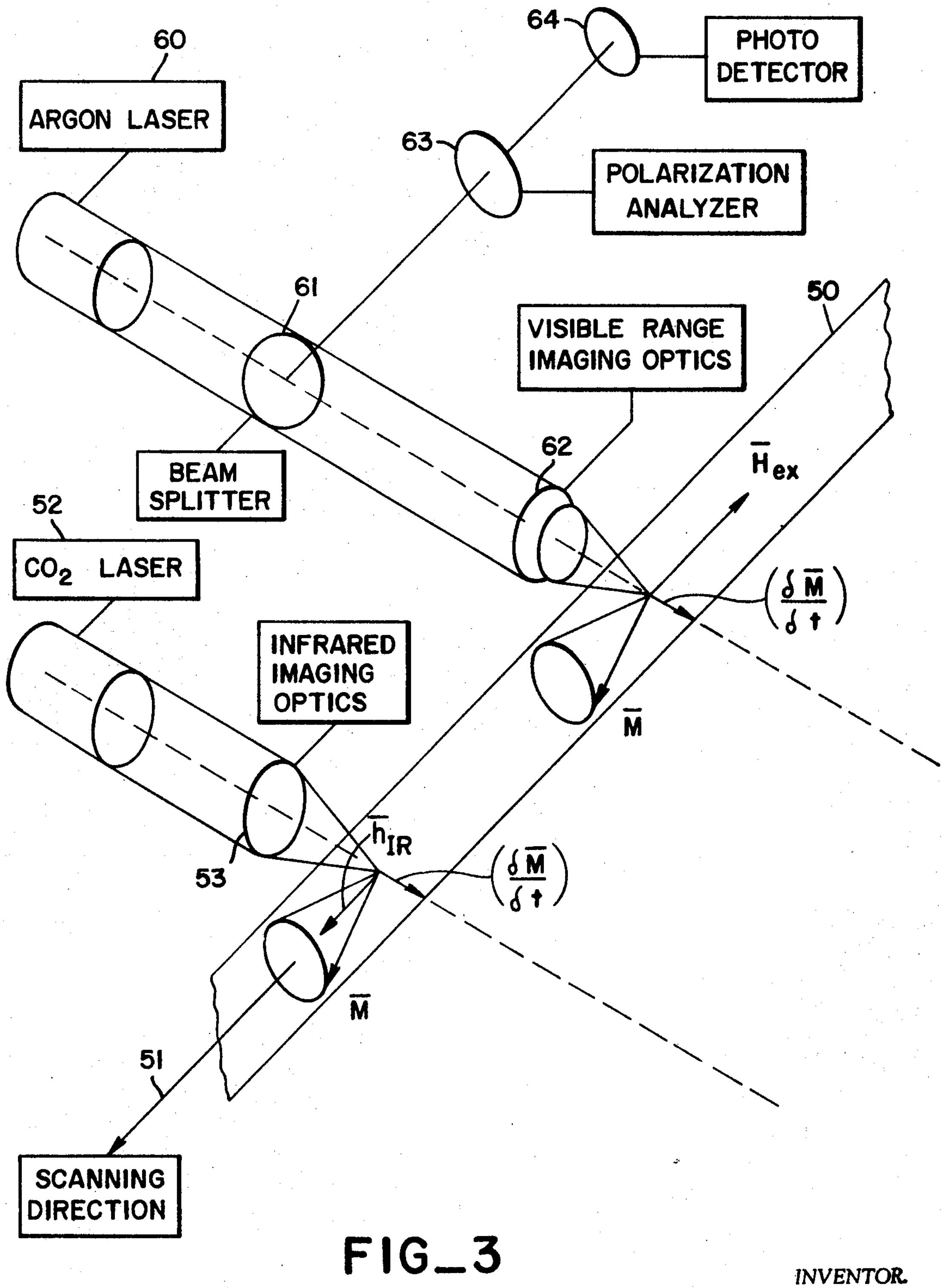
FIG. 3 is a diagrammatic representation of another coherent light data recording and reading system embodying the present invention.

FIG. 3 diagrammatically illustrates a laser recording system in which remanent data tracks are induced in the recording medium by parametric excitation of exchange resonance spinwave modes in the infrared spectral region at generally twice the exchange resonance spinwave mode frequencies of the magnetizable layer of the recording medium. The recording medium 50 in the configuration of an elongate tape is of the type generally shown in FIG. 2. The tape is formed of a polyester film substrate having a thickness in the range of 1 to 1½ mils. Coated on the polyester substate is a thin film of rhodium formed by sputtering to a thickness of approximately 1,000 A. units. Coated over the thin rhodium layer is a layer of yttrium iron garnet of substantially uniform thickness in the range between 100 A. units and 10 microns. The tape is carried by a tape transport system which translates the tape in the direction of arrow 51.

The recording laser 52 consists of a $CO_2$ laser operating at a frequency of 10.6 microns in the infrared range. Infrared imaging optics 53 focus the $CO_2$ laser beam in a diffraction limited spot size onto the YIG layer of the recording medium 50. The magnetic-field vector $\overline{h}_{IR}$ of the $CO_2$ laser incident on the recording medium is generally parallel to the Weiss magnetic exchange field vector $\overline{H}_{ex}$ thereby effecting parallel parametric optical pumping of the exchange resonance spinwave modes excited at half the frequency of the $CO_2$ laser beam. After cessation of parametric excitation, the excited spinwave modes relax to minimum energy configurations determined by the orientation of the incident infrared field within the imaging area of $CO_2$ laser beam, and the direction of parametric excitation. The relaxed minimum energy configuration in the YIG film is different from the state of the material before irradiation providing remanent curls or vortices of dynamic magnetization $d\overline{M}/dT$) along tracks in the recording medium thus representing a two dimensional magnetic memory. The tracks of dynamic magnetization induced within the spin system of the YIG material effects a strong magneto-optical Faraday rotation detectable by the reading laser beam.

The reading laser consists of an Argon II ionic laser 60 operating at 4,880 A. units. The light beam generated by laser 60 passes through beamsplitter 61 and is focused by imaging optics 62 onto a remanent data track recorded on the recording tape 50. Optical tracking of the recorded data tracks can be accomplished in the manner heretofore described. The incident laser beam is reflected back by the reflective layer of the recording medium via beamsplitter 61 to the polarization analyzer 63 and photodetector 64 which, by means of the Faraday effect, detect variations in the intensity of the reflected beam which correspond to variations in the dynamic magnetization along the remanent data tracks. The intensity of the reflected Argon II laser beam corresponds to and is a function of the square of the parametric excitation and resulting remanent dynamic magnetization along the data tracks, which in turn vary as a function of the recorded signal. The Faraday effect imparted by the thin YIG film is doubled by means of the reflective layer which passes the incident laser beam back through the film before it is detected. Furthermore, the reading laser 60 is chosen so that the generated frequency is in the range of maximum magneto-optical Faraday effect for the YIG material.

Thus, laser recording by parametric excitation is accomplished in spectral regions of maximum radiation absorption for the YIG film thereby providing maximum recording efficiency while readout is accomplished at wavelengths providing optimum Faraday rotation to thereby provide maximum signal output while at the same time avoiding the exchange resonant mode excitation and absorption bands of the YIG material.

While laser recording by means of parametric excitation has been described with reference to the system illustrated in FIG. 3, optical pumping may also be accomplished by quantum-mechanical excitation in the visible or ultraviolet bands which effect the $Fe^{3+}$ ions of the YIG molecules. According to either method, optical excitation is accomplished in spectral regions of maximum radiation absorption for the magnetizable material of the recording medium thereby providing maximum recording efficiency.

In forming the recording medium, any photomagnetically responsive magnetizable material, whether ferromagnetic, ferrimagnetic, anti-ferromagnetic or metamagnetic which can be deposited in a substantially transparent thin film is suitable. The magnetizable material can be vacuum deposited or sputtered onto the substrate. When sputtering, molecular oxygen ($O_2$) rather than Argon should be used in order to preserve the ferrimagnetism of material such as the ferrimagnetic garnets. The Weiss magnetic exchange field of the deposited film can be oriented parallel to and within the film plane by sputtering in a steady magnetic field oriented parallel to the surface of the film and substrate. The thickness of the film of magnetizable material is determined by the two opposing parameters. The thinner the film, the greater the magnetic coercivity obtainable. On the other hand, the thicker the film, the greater the magneto-optical Faraday rotation during readout of stored data. For ferrimagnetic garnet a thickness in the range of 100 A. units to 10 microns has been found satisfactory. The recording medium can be formed in the variety of configurations such as tapes, strips, disks, drums, or other forms. The magnetizable layer can be formed directly on a substrate or on a reflective layer coated on the substrate. Because the recording layer permits erasable data storage, it is particularly suitable for computer mass memory and buffer storage applications. To this end, instead of forming the layer of magnetizable material on a substrate such as a tape, the recording material can be coated directly on the face of a drum suitable for use in such a computer system.

Furthermore, a variety of record medium transports can be utilized and either the record medium or the optical record/read head through which the laser beam is directed, or both, may be translated relative to each other. All of the moving parts may be servo-controlled for accurate handling of data in the manner described in U.S. Pat. application Ser. No. 807,553, referred to above. A variety of scanning rasters may be used, such as helical, longitudinal, transverse or parallel. The particular configuration of the recording medium and the recording medium transport in the laser recording system are therefore not critical to the present invention. In order to increase the accuracy of the system, all optical components in the system can be of the reflective type rather than the refractive type, permitting greater control of physical parameters.

What is claimed is:

1. A magneto-optical recording medium comprising:
a substrate;
a thin reflective layer coated on said substrate;
and a thin layer of substantially transparent photomagnetically responsive magnetizable material having an anisotropic optical response under magnetization coated on said reflective layer, said material magnetizable by selected optical energy at temperatures below the Curie point of said material.

2. A recording medium as set forth in claim 1 wherein said layers are formed in the configuration of an elongate tape.

3. A recording medium as set forth in claim 1 wherein said reflective layer and said layer of magnetizable material are formed by sputtering at radio frequency.

4. A recording medium as set forth in claim 1 wherein said reflective layer comprises a metallic layer of approximately one optical thickness of the metal comprising the layer.

5. A recording medium as set forth in claim 1 wherein said layer of magnetizable material is approximately between 100 A. units and 10 microns in thickness.

6. A recording medium as set forth in claim 5 wherein said magnetizable material is a transparent ferrimagnetic garnet.

7. A magneto-optical medium comprising:
a substrate;
a thin reflective metallic layer coated on said substrate;
and a thin layer of a substantially transparent ferrimagnetic garnet coated on said reflective layer.

8. A recording medium as set forth in claim 7 wherein said ferrimagnetic garnet comprises;
yttrium iron garnet.

9. A recording medium as set forth in claim 8 wherein said thin reflective layer comprises:
rhodium.

10. A magneto-optical recording system comprising:
a recording medium comprising a substrate and a layer of substantially transparent photomagnetically responsive material having an anisotropic optical response under magnetization coated on said substrate, said material magnetizable by selected optical energy at temperatures below the Curie point of said material;
and means optically inducing localized photomagnetization in tracks along the layer of ferromagnetic material at temperatures below the Curie point of the material to thereby provide remanent tracks of variable birefringence in the magnetizable material as a function of a signal to be recorded.

11. A magneto-optical recording system as set forth in claim 10 wherein said means optically inducing localized photomagnetization comprises a polarized laser beam and means for focusing said beam onto the recording medium.

12. An erasable coherent light data recording system comprising:

an optical data recording medium including a thin layer of substantially transparent photomagnetically magnetizable material having an anisotropic optical response under magnetization coated on a substrate, said material magnetizable by selected optical energy at temperatures below the Curie point of said materials;

means generating a polarized beam of coherent light in at least 1 wavelength suitable for optically pumping exchange resonance spinwave modes of the magnetizable material;

means focusing said light beam onto the layer of magnetizable material on the recording medium;

means providing relative motion between the light beam and the recording medium;

means for adjusting the intensity of the light beam and/or the rate of relative motion between the light beam and recording medium so that the thermal temperature developed in the layer of magnetizable material is less than the Curie temperature of the material during recording; and means modulating the light beam intensity with a signal to be recorded;

said light beam intensity and/or rate of relative motion between the light beam and recording medium also adjustable to produce a temperature in the magnetizable layer greater than the Curie temperature of the material for erasing stored data.

13. An erasable coherent light data recording system as set forth in claim 12 wherein is provided means generating a reading beam of coherent light in a spectral range suitable for detecting magneto-optical Faraday rotation of the reading beam by localized magnetization in the reading medium and means for focusing said reading beam on the recording medium.

14. A method for optically recording data on a layer of substantially transparent photomagnetically magnetizable material having an anisotropic optical response under magnetization, coated on a substrate comprising:

focusing a polarized coherent light beam having a wavelength suitable for optically pumping exchange resonance spinwave modes of the magnetizable material onto said layer of magnetizable material;

moving the focused beam and magnetizable layer relative to each other and adjusting the light beam intensity so that the thermal temperature developed in the material of the layer is less than the Curie temperature of the material;

and modulating the intensity of said laser beam with a signal to be recorded, thereby providing remanent tracks of variable birefringence in the layer of magnetizable material.

15. A method for optically recording data as set forth in claim 14 wherein said coherent light beam wavelength is selected to optically pump by parametric excitation.

16. A method for optically recording data as set forth in claim 14 wherein said coherent light beam wavelength is selected to optically pump by quantum-mechanical excitation.

17. A method for optically storing and erasing data in a recording medium comprising a layer of photomagnetically responsive material having an anisotropic optical response under magnetization coated on a substrate comprising:

focusing a coherent beam of polarized light having a frequency substantially twice the spinwave resonance frequency of the photomagnetically responsive material onto said recording medium;

optically modulating said coherent beam of light with a signal to be recorded;

translating said laser beam and recording medium relative to each other; and adjusting the laser beam intensity and the rate of translation between said laser beam and recording medium so that thermal temperatures induced by the laser beam in the magnetizable layer of the recording medium are less than the Curie temperature of the material and at the same time adjusting the intensity of said laser beam and the rate of translation sufficient optically to induce localized remanent tracks of variable birefringence in the magnetizable layer as a function of the signal to be recorded.

18. A method for optically storing and erasing data as set forth in claim 17 wherein is provided the additional step of adjusting the laser beam intensity and rate of translation to a level to induce in the recording medium a thermal temperature above the Curie point of the magnetizable material to thereby destroy any remanent tracks of variable magnetization.

19. A magneto-optical recording medium comprising:

a reflective substrate;

and a thin layer of substantially transparent photomagnetically responsive magnetizable material having an anisotropic optical response under magnetization coated on said substrate, said material magnetizable by selected optical energy at temperatures below the Curie point of said material.

20. A recording medium as set forth in claim 19 wherein said medium is formed in the configuration of an elongate strip.

21. A recording medium as set forth in claim 19 wherein said layer of magnetizable material is formed by RF sputtering with $O_2$.

22. A recording medium as set forth in claim 19 wherein said layer of magnetizable material is approximately between 100 A. units and 10 microns in thickness.

23. An erasable coherent light data recording and reading method comprising:

forming a thin layer of substantially transparent photomagnetically responsive magnetizable material having an anisotropic optical response under magnetization, on a substrate;

generating a polarized beam of coherent light at least at one wavelength suitable for optically pumping exchange resonance spinwave modes in the magnetizable material;

focusing said light beam onto the layer of magnetizable material on the recording medium;

scanning said light beam along the recording medium;

adjusting said light beam intensity and/or scanning velocity so that the thermal temperature developed in the layer of magnetizable material is less than the Curie temperature of the material during recording;

modulating the light beam intensity with a signal to be recorded, thereby optically to induce in the recording medium remanent tracks of variable birefringence in the layer of magnetizable material corresponding to the signal to be recorded;

and generating a reading beam of coherent light in a spectral range suitable for detecting magneto-optical Faraday rotation of the reading beam by localized magnetization in the recording medium.

24. An erasable coherent light data recording system as set forth in claim 23 wherein is provided means for adjusting said recording light beam intensity and/or said scanning velocity to produce in the magnetizable layer a thermal temperature greater than the Curie temperature of the material for erasing stored data.

25. An erasable coherent light data recording system as set forth in claim 23 wherein the wavelength of said recording beam of coherent light is selected for optically pumping by parametric excitation.

26. An erasable coherent light data recording system as set forth in claim 23 wherein the wavelength of said recording beam of coherent light is selected for optically pumping by quantum-mechanical excitation.

27. An erasable coherent light data recording system as set forth in claim 23 wherein said reading beam of coherent light is substantially near the optimum wavelength for detection of magneto-optical Faraday rotation in the magnetizable material of the recording medium, said wavelength also being substantially non-coincident with any spinwave excitation band of said magnetizable material of the recording medium.

28. An erasable coherent light data recording system comprising:

a recording medium comprising a thin layer of substantially transparent photomagnetically responsive magnetizable material having an anisotropic optic response under magnetization, coated on a substrate;

recording laser means for generating a polarized beam of coherent light in a wavelength of substantially twice the frequency of exchange resonance spinwave modes in the magnetizable material of the recording medium;

means focusing said recording light beam onto the layer of magnetizable material on the recording medium;

means for scanning said recording light beam along the recording medium;

said recording light beam intensity and/or the scanning velocity adjusted so that the thermal temperature developed in the layer of magnetizable material is less than the Curie temperature of said material during recording;

means modulating the light beam intensity with a signal to be recorded thereby optically to induce in the recording medium remanent tracks of variable birefringence corresponding to the signal to be recorded;

reading laser means for generating a reading beam of coherent light at a wavelength substantially near the optimum wavelength for detecting magneto-optical Faraday rotation in the magnetizable material of the recording medium;

means focusing said reading light beam onto the recording medium;

and means for scanning said reading beam along the recording medium.

29. An erasable coherent light data recording system as set forth in claim 28 wherein is provided means for adjusting the recording light beam intensity and/or recording light beam scanning velocity relative to the recording medium to produce in the magnetizable layer of the recording medium a thermal temperature greater than the Curie temperature of the material for erasing stored data.

30. An erasable coherent light data recording system as set forth in claim 28 wherein said photomagnetically responsive magnetizable material comprises a ferrimagnetic iron garnet material, wherein said recording laser means comprises a $CO_2$ laser, and wherein said reading laser comprises an Argon II ionic laser.

* * * * *